US007190817B1

(12) United States Patent
Schneider et al.

(10) Patent No.: US 7,190,817 B1
(45) Date of Patent: Mar. 13, 2007

(54) MOBILE FINGERPRINT SCANNER AND DOCKING STATION

(75) Inventors: John K. Schneider, Snyder, NY (US); Stephen M. Gojevic, Tonawanda, NY (US); Horatio W. Turner, IV, King George, VA (US)

(73) Assignee: Ultra-Scan Corporation, Amherst, NY (US)

( * ) Notice: Subject to any disclaimer, the term of this patent is extended or adjusted under 35 U.S.C. 154(b) by 1178 days.

(21) Appl. No.: 09/658,638

(22) Filed: Sep. 11, 2000

Related U.S. Application Data

(60) Provisional application No. 60/153,182, filed on Sep. 10, 1999.

(51) Int. Cl.
*G06K 9/00* (2006.01)
(52) U.S. Cl. ..................... 382/126; 382/124
(58) Field of Classification Search ........ 382/115–116, 382/120–127, 312–315; 713/186, 200, 300
See application file for complete search history.

(56) References Cited

U.S. PATENT DOCUMENTS

| | | | | |
|---|---|---|---|---|
| 5,456,256 A | * | 10/1995 | Schneider et al. | 600/445 |
| 5,467,403 A | * | 11/1995 | Fishbine et al. | 382/116 |
| 5,790,668 A | * | 8/1998 | Tomko | 713/186 |
| 5,878,211 A | * | 3/1999 | Delagrange et al. | 713/200 |
| 6,122,394 A | * | 9/2000 | Neukermans et al. | 382/124 |
| 6,886,104 B1 | * | 4/2005 | McClurg et al. | 382/124 |

OTHER PUBLICATIONS

American Association of Motor Vehicle Administrators ("Smart Card Usage in Motor Vehicle Administration", Published in Jan. 1999, pp. i-v and pp. 1-71).*

* cited by examiner

*Primary Examiner*—Duy M. Dang
(74) *Attorney, Agent, or Firm*—Hodgson Russ LLP

(57) ABSTRACT

A system including a mobile or portable fingerprint scanner and one or more docking stations adapted to operatively receive the scanner. The scanner can be hand carried to various locations for obtaining fingerprint images and other information such as images from bar code scanning. The scanner is battery operated and has the capacity of storing a number of such images. The docking station is in the form of a receptacle into which the scanner is inserted after obtaining one or more images. While the scanner is operatively received in the docking station, the image(s) stored in the scanner are downloaded via a connection to a personal computer or the like, the scanner battery is recharged and the docking station performs various diagnostic operations on the scanner before it is withdrawn from the docking station for further use. In a typical law enforcement situation, the docking station is located within the law enforcement vehicle and the scanner can be used by law enforcement personnel at locations remote from the vehicle. In a typical security situation, a single scanner is carried by the security officer and a docking station is located at each checkpoint or location where the officer is to perform an inspection. Each bay station has a unique identification and there is bidirectional exchange of information between the scanner and the bay station so that the identity of the security officer can be confirmed and a record of the inspections is made which can be monitored at any time.

2 Claims, 3 Drawing Sheets

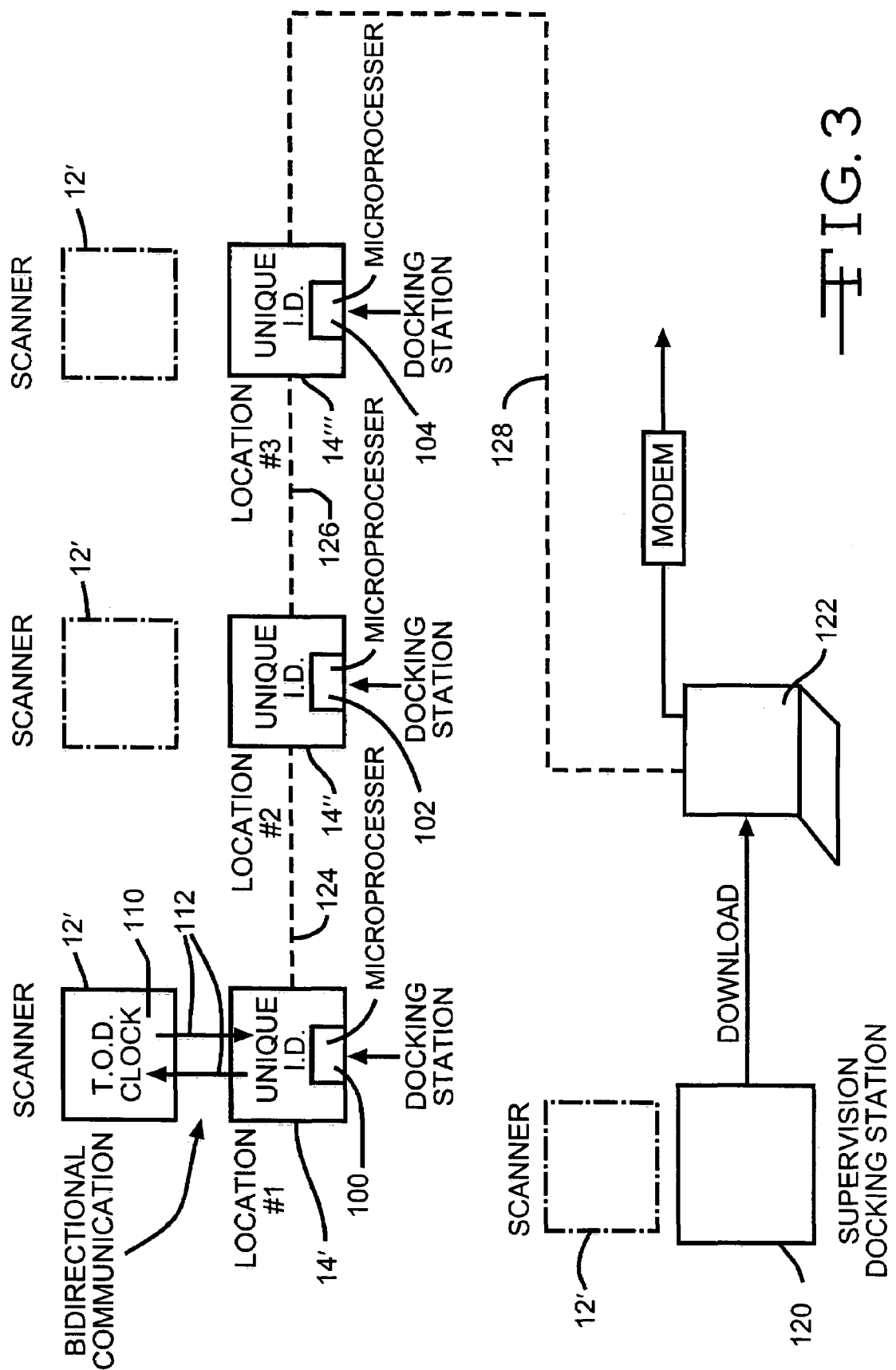

MOBILE FINGERPRINT SCANNER AND DOCKING STATION

CROSS-REFERENCE TO A RELATED APPLICATION

Applicants hereby claim priority based on Provisional Application No. 60/153,182 filed on Sep. 10, 1999 and entitled "Mobile Fingerprint Scanner And Docking Station" which is incorporated hereby by reference.

BACKGROUND OF THE INVENTION

Inkless fingerprint scanners, also known as live scan fingerprint readers or biometric devices, have been widely used for many years. These systems obtain an image of the fingerprint without the use of inks. Once an image is acquired, it is then processed and an identification or verification of the individual's identity is made.

Many different techniques have been used to obtain an image of the finger including optical scanners, thermal scanners, capacitive scanners, E-field sensors, ultrasonic scanners, and many more. Each uses a different modality or technique to image the same physical characteristic; the ridge structure of the finger.

In use of such scanners in law enforcement and other applications it would be highly desirable to provide a mobile or portable scanner which can be hand carried easily for convenient use at various physical locations. It would also be highly desirable to provide the capability of interfacing with such a scanner at one or more physical locations for such operations as downloading fingerprint images and other information stored in the scanner, scanner battery charging and scanner diagnosis.

SUMMARY OF THE INVENTION

The present invention provides a system including a mobile or portable fingerprint scanner and one or more docking stations adapted to operatively receive the scanner. The scanner can be hand carried to various locations for obtaining fingerprint images and other information such as images from bar code scanning. The scanner is battery operated and has the capacity of storing a number of such images. The docking station is in the form of a receptacle into which the scanner is inserted after obtaining one or more images. While the scanner is operatively received in the docking station, the image(s) stored in the scanner are download via a connection to a personal computer or the like, the scanner battery is recharged and the docking station performs various diagnostic operations on the scanner before it is withdrawn from the docking station for further use. In a typical law enforcement situation, the docking station is located within the law enforcement vehicle and the scanner can be used by law enforcement personnel at locations remote from the vehicle. In a typical security situation, a single scanner is carried by the security officer and a docking station is located at each checkpoint or location where the officer is to perform an inspection. Each bay station has a unique identification and there is bidirectional exchange of information between the scanner and the bay station so that the identity of the security officer can be confirmed and a record of the inspections is made which can be monitored at any time.

The foregoing and additional advantages and characterizing features of the present invention will become clearly apparent upon a reading of the ensuing detailed description together with the included drawing. The following detailed description of the invention, when read in conjunction with the accompanying drawings, is in such full, clear, concise and exact terms as to enable any person skilled in the art to which it pertains, or with which it is most nearly connected, to make and use the invention.

BRIEF DESCRIPTION OF THE DRAWING FIGURES

FIG. 3 is a schematic diagram illustrating application of the mobile fingerprint scanner and docking station of the present invention in a security system.

DETAILED DESCRIPTION OF THE ILLUSTRATED EMBODIMENTS

Figure 1:
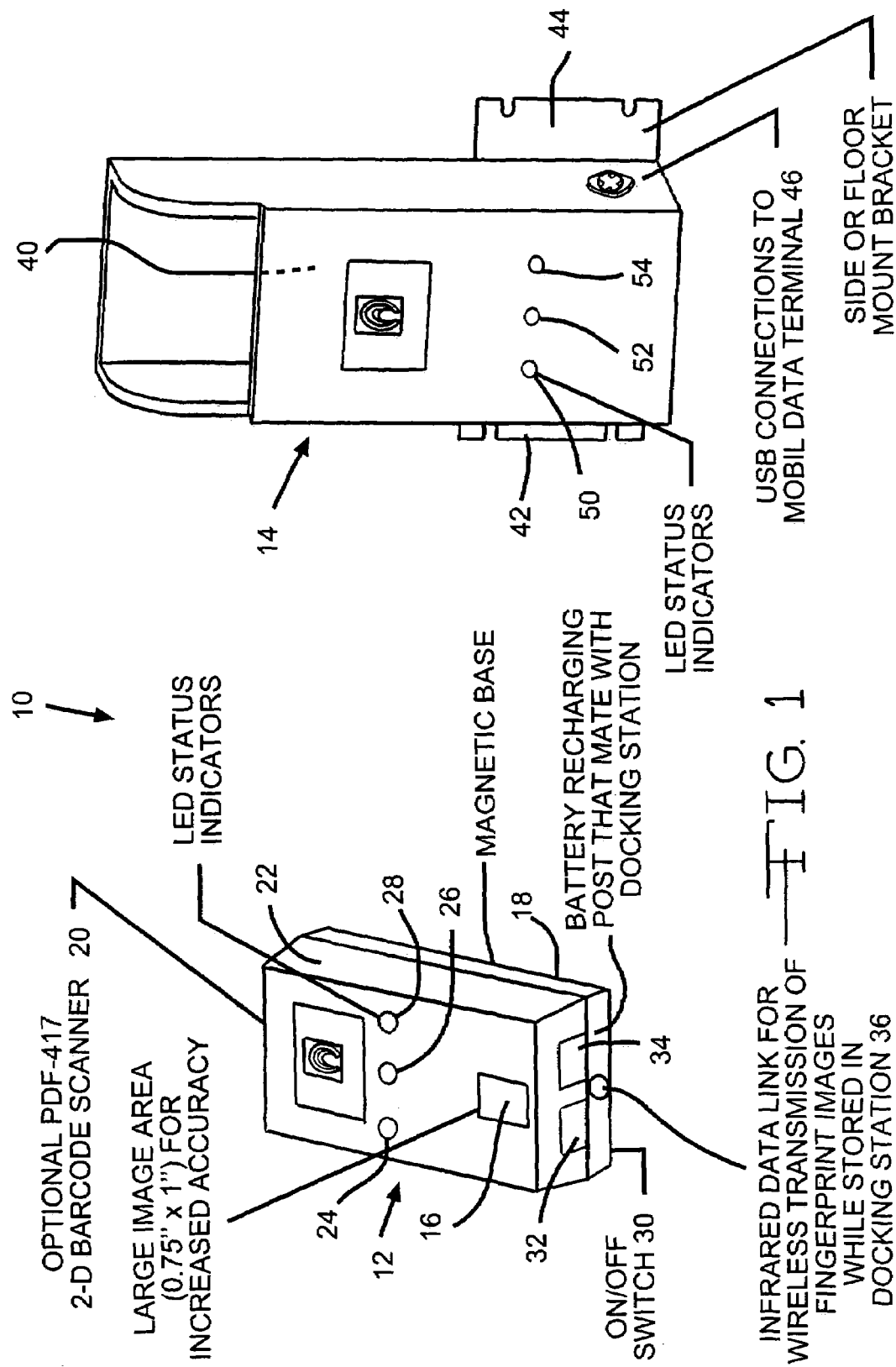
FIG. 1 is a diagrammatic view of the mobile fingerprint scanner and docking station according to the present invention.
Figure 2:
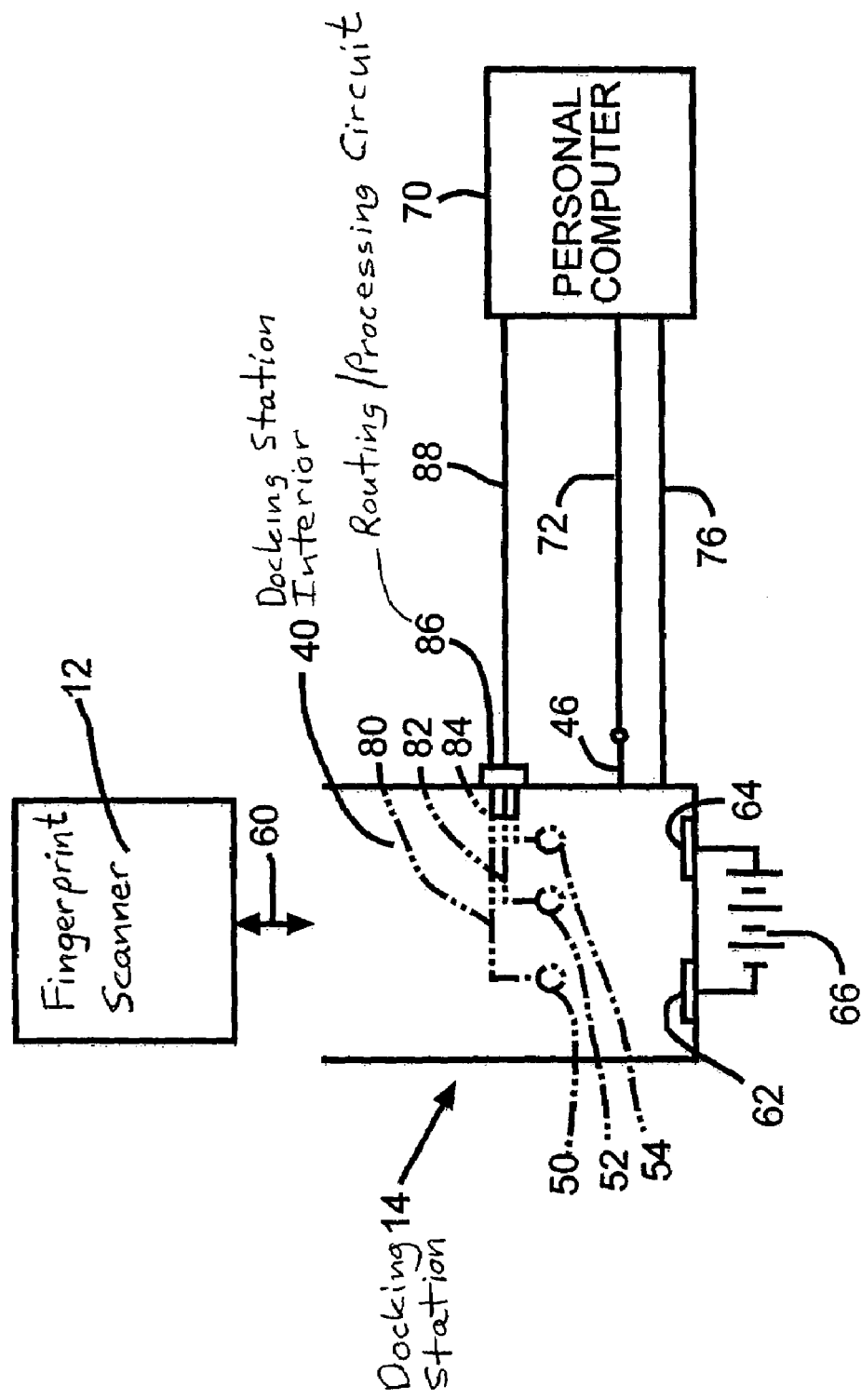
FIG. 2 is a schematic diagram further illustrating the mobile fingerprint scanner and docking station according to the present invention.

Referring first to FIGS. 1 and 2 there is shown and described a system 10 according to the present invention including a mobile or portable fingerprint scanner 12 and a docking station 14 adapted to operatively receive the scanner. The scanner 12 can be hand carried to various locations for obtaining fingerprint images and other information such as images from bar code scanning. The scanner 12 is battery operated and has the capability of storing a number of such images. The scanner 12 can be of various types including, but not limited to, ultrasonic, optical, capacitance, E-field and thermal/infrared. By way of example, the mobile scanner 12 can be an ultrasonic scanner of the type shown in U.S. Pat. No. 5,647,364 issued Jul. 15, 1997, the disclosure of which is hereby incorporated by reference. Referring to FIG. 10 of that patent, memory 252 would have the capability of storing several fingerprint images and bar codes which will be described. In addition, the scanner of that patent would be adapted for battery operation. In a typical law enforcement situation, the scanner is carried by the law enforcement officer, such as in a pouch on his belt, to wherever the subject(s) is to be fingerprinted is located. The officer can set the scanner on a suitable supporting surface, such as the hood of an automobile, and then use the scanner to take as many fingerprint images as needed. The subject's finger is placed on the image area 16 and the fingerprint is scanned to develop an image thereof as explained in the above-referenced U.S. Pat. No. 5,647,364. The images are stored in the scanner 12 for later retrieval. A magnetic base 18 on the scanner facilitates temporary securement of the scanner on the vehicle body during use. The scanner 12 can be provided with bar code scanning capability via a bar code scanner 20 on the end of housing 22 so that when the officer takes a fingerprint image of a subject he also can scan the bar code information on the subject's vehicle registration and/or vehicle operator's license. LED indicators 24, 26 and 28 are provided to signal various scanner conditions as will be described. An on-off switch 30 controls supply of power to the scanner and hence its operation. Scanner 12 is provided with battery recharging posts 32, 34 on one end of housing 22 which mate with contacts at docking station 14 for recharging the scanner battery in a manner which will be described. Scanner 12 also is provided with an infrared data link 36 for wireless transmission of fingerprint images while stored in docking station 14 as will be described.

The docking station 14 is in the form of a receptacle into which the scanner is inserted after obtaining one or more images. As shown in FIG. 1, the docking station is generally hollow rectangular in shape, open at one end, and having an interior region 40 shaped and sized to receive the scanner in a snug but removable manner. While the scanner is operatively received in the docking station 14, the image(s) stored in the scanner are downloaded via a connection to a personal computer or the like, the scanner battery is recharged and the docking station performs various diagnostic operations on the scanner before it is withdrawn from the docking station for further use. In a typical law enforcement situation, the docking station 14 is located within the law enforcement vehicle, being mounted to the floor or inside wall of the vehicle, such as by the brackets 42, 44 or the like and the scanner 12 can be used by law enforcement personnel at locations remote from the vehicle as previously described. When the law enforcement officer returns to the vehicle, he inserts the scanner 12 in the docking station 14. The scanner 12 is retained within the docking station by a magnetic latch or other suitable means (not shown). The docking station 14 is connected to a source of 12 volts d.c. in the vehicle, such as to the vehicle battery by appropriate connection or through the cigarette lighter receptacle. The docking station 14 also is connected to the personal computer commonly provided in law enforcement vehicles, via the USB connection 46 indicated in FIG. 1. Docking station 14 also is provided with LED status indicators 50, 52 and 54. While the scanner 12 is in the docking station 14, the images stored therein are downloaded to the onboard PC for processing. The scanner battery is recharged while in the docking station 14. The two battery charging posts 32, 34 shown in FIG. 1 on one end of the scanner 12 mate with corresponding contacts in the docking station 14 to connect the 12V vehicle supply to the scanner battery. Also, each time the scanner 12 is stored in the docking station 14, a diagnostic routine is run on the scanner. If a problem is detected, the next time the scanner 12 is removed from the docking station 14 the scanner automatically is disabled and the appropriate LED status indicator is operated.

Table 1 sets forth additional features of scanner 12 and docking station 14, and Table 2 sets forth various advantages of the same.

TABLE 1

Scanner

Image Size - 0.75" w × 1.0" l
Stores up to 8 complete fingerprint images
LED Indicators:
Green - scanner ready to acquire image
Amber - flashes the number of fingerprint
images stored internally
Red - low battery indicator
Resolution - 500 dpi, 256 levels of grey
Infrared wireless communication link downloads
images to docking station
Standard 9 volt rechargeable battery provides
several hours of operation
Size: 5.75" l × 3.25" w × 2.0" h
Weight 2.1 lbs
Docking Station 12 volt DC operation
Interfaces to Mobile Data Terminal via USB
port
LED indicators
Green - power on
Amber - transferring data to MDT
Red - scanner batter recharging TABLE 1-continued Built-in 9 volt battery charger
Floor or side wall mount options
Complete Software device drivers provided as a
DLL for Win 95/98 and NT
Size: 9" l × 3.8" w × 2.6" d
Weight 1.7 lbs
General UL 1950, CSA No. 950-22.2, and FCC approvals
Reliability - vibration tested to 9.5 Gs, 20–
2000 Hz, random sinusoidal
Operating Temperature - 140° F. (max)
Storage Temperature - 158° F. (max)

TABLE 2

Proprietary ultrasonic technology unaffected
by most contamination found on fingers or
platen
Stores up to 8 individual fingerprints for
transferring to Mobile Data Terminal
Operation unaffected by ambient light or glare
Self-test scanner diagnostics automatically
activated upon removal from the docking
station
Images automatically deleted upon successful
transfer to docking station
Magnetic base easily attached to vehicle
Durable scratch resistant platen
Rugged construction designed to withstand the
harshest of environments
Stores in pouch for easy mounting on the law
enforcement officer's belt
Securely locks into docking station
Vehicle docking station installs easily using
floor or side mount bracket The foregoing is illustrated further in FIG. 2. The bidirectional arrow 60 represents the path along which scanner 12 is inserted into and withdrawn from interior region 40 of docking station 14. Contacts 62 and 64 within scanner 14 are connected to a battery 66 or other appropriate voltage source for recharging the battery within scanner 12 when scanner contacts 32, 34 mate with docking station contacts 62 and 64. A personal computer 70, i.e. the onboard PC previously mentioned, is connected via cable 72 to the USB connection 46 on docking station 14 for downloading the fingerprint images stored in scanner 12 for processing by computer 70. Another connection via cable 76 between computer 70 and station 14 is shown in FIG. 2 for the purpose of performing the diagnostic routines on scanner 12 as previously described. The LED indicators 50, 52 and 54 are connected by lines 80, 82 and 84 respectively to an appropriate routing/processing circuit 86 which, in turn, is connected by cable 88 to computer 70 for control of the indicators. Obviously, the three cables 72, 76 and 88 shown in FIG. 2 can be combined into a single cable connection between PC 70 and station 14.

FIG. 3 illustrates application of the mobile or portable fingerprint scanner and docking station of the present invention in a security system. In a typical security situation, a single scanner 12' is carried by the security officer and a docking station is located at each checkpoint or location where the officer is to perform an inspection.

In FIG. 3 the three locations identified #1, #2 and #3 represent checkpoints or location where the security guard is scheduled to inspect or contact during his inspection round. While three locations are shown in FIG. 3 by way of illustration, there can be any number of such locations. A docking station of the type shown in FIG. 1 is located at each location #1, #2 and #3 in FIG. 3. They are designated 14', 14" and 14" in FIG. 3. However, each docking station is a stand alone unit, not connected to a PC, and has its own power supply. A microprocessor is provided in each docking station and each station has its own unique identification number or code. The microprocessors are designated 100, 102 and 104 in FIG. 3. Each scanner is provided with a time of day clock, for example clock 110 in scanner 12', and bidirectional communication represented by arrows 112 in FIG. 3 is provided between each scanner and the docking station when the scanner is placed in the station.

When the security officer makes his round, when he reaches each of the locations #1, #2 and #3 shown in FIG. 3, he operates the scanner carried with him to scan his fingerprint then inserts the scanner into the docking station at that location. The bi-directional communication between scanner and docking station provides a record of the time of day, the unique i.d. of the docking station and the fingerprint image of the security officer. This record can be stored in either or both of the scanner and docking station. Then, when the security officer completes the round, he inserts his scanner into the supervision base or docking station 120 which downloads the fingerprint images along with the times of day correlated with the docking station identification numbers to the PC 122 for further processing such as sending to a central monitoring station. As a result, control is provided on the security officer himself by way of the fingerprint imaging and his round by way of the times of day recorded against the docking station identifications. If desired, the docking stations can be connected together for direct transmission to the PC or other monitor as indicated by the broken lines 124, 126 and 128 in FIG. 3.

The principles of the arrangement of FIG. 3 can be applied to other situations, for example in monitoring the rounds of persons who inspect and service ATM machines. In all of the situations, the entire monitoring task can be accomplished using a single scanner in combination with a number of docking stations. Since the docking stations are relatively less expensive to manufacture this can result in economic advantages. In the application illustrated in FIGS. 1 and 2, an entire fleet of law enforcement vehicles can be equipped with docking stations at relatively low cost and the fingerprint scanners can be acquired according to operational plans and budget.

It is therefore apparent that the present invention accomplishes its intended objectives. While embodiments of the present invention have been described in detail, that has been done for the purpose of illustration, not limitation.

The invention claimed is:

1. A fingerprint identification and security system comprising:
 (a) a portable fingerprint scanner which can be carried on a person and which includes a time of day clock and a port for data communication to and from the scanner;
 (b) a plurality of docking stations at locations where inspections are to be performed, each of the docking stations being in the form of a receptacle for receiving the scanner, each docking station having a microprocessor and a unique code identification, there being bidirectional data communication between the docking station and the scanner received therein; and
 (c) a supervisory docking station in the form of a receptacle for receiving the scanner for downloading fingerprint images, times of day and docking station identifications from the scanner received therein; and
 whereby when a security person makes a round when he reaches each inspection location he operates the scanner to image his fingerprint and then inserts the scanner into the docking station at that location and a record is made of the time of day, unique identification of the docking station and fingerprint image of the security person which is stored in the scanner and then at the end of the round the security person inserts the scanner into the supervisory docking station which downloads the fingerprint images and times of day correlated with the docking station identification codes.

2. A system according to claim 1, further including a computer operatively associated with the supervisory docking station for processing the downloaded fingerprint images, times of day and docking station identification codes.

* * * * *

UNITED STATES PATENT AND TRADEMARK OFFICE
CERTIFICATE OF CORRECTION

PATENT NO.        : 7,190,817 B1                                    Page 1 of 1
APPLICATION NO.   : 09/658638
DATED             : March 13, 2007
INVENTOR(S)       : Schneider et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (233) days Delete the phrase "by 1178 days" and insert -- by 1139 days --

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,190,817 B1 |
| APPLICATION NO. | : 09/658638 |
| DATED | : March 13, 2007 |
| INVENTOR(S) | : Schneider et al. |

Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (1178) days Delete the phrase "by 1178 days" and insert -- by 1139 days --

This certificate supersedes the Certificate of Correction issued April 29, 2008.

Signed and Sealed this

Fifth Day of January, 2010

David J. Kappos
*Director of the United States Patent and Trademark Office*